United States Patent Office 3,822,303
Patented July 2, 1974

3,822,303
TRIMETHYL SILYL ESTERS OF PROSTAGLANDIN E ACIDS AND ESTERS AND PROCESS THEREFOR
Ernest W. Yankee, 6828 Rothbury, Portage, Mich. 49452
No Drawing. Filed Oct. 19, 1971, Ser. No. 190,667
Int. Cl. C07f 7/18
U.S. Cl. 260—448.8 R                    14 Claims

ABSTRACT OF THE DISCLOSURE

Prostaglandin E acids and esters with a methyl or an ethyl substituent at the C-15 position are obtained in improved yields by selectively silylating the corresponding prostaglandin $F_\alpha$ compounds at the C-11 position, oxidizing the C-9 hydroxyl to an oxo group, and then removing the silyl group or groups by hydrolysis.

BACKGROUND OF THE INVENTION

This invention relates to a process for preparing intermediates useful in the preparation of prostaglandin derivatives, and to those novel intermediates. Particularly this invention relates to certain 11-silyl intermediates of prostaglandin $F_\alpha$ ("$PGF_\alpha$") compounds with a methyl or ethyl substitutent at the C-15 position, which are useful in preparing the corresponding prostaglandin E ("PGE") compounds.

This invention relates to novel compositions of matter, to novel methods for producing those, and to novel chemical intermediates useful in those processes. In particular, this invention relates to novel derivatives of prostanoic acid which has the following structure and atom numbering:

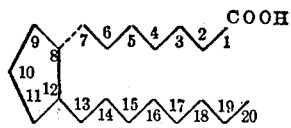

I

Various derivatives of prostanoic acid are known in the art. These are called prostaglandins. See, for example, Bergstrom et al., Pharmacol. Rev. 20, 1 (1968), and references cited therein. For example, prostaglandin $E_1$ ($PGE_1$) has the following structure:

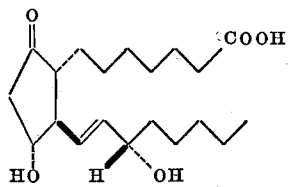

II

Prostaglandin $E_2$ ($PGE_2$) has the following structure:

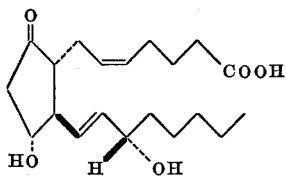

III

Prostaglandin $E_3$ ($PGE_3$) has the following structure:

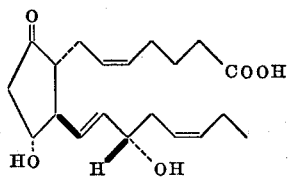

IV

Dihydroprostaglandin $E_1$ (dihydro-$PGE_1$) has the following structure:

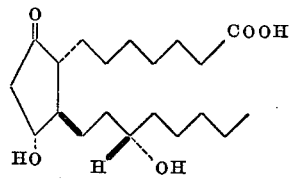

V

Prostaglandins with a secondary alpha or beta hydroxy in place of the ring oxo of the prostaglandins E are also known. These are called prostaglandins F. For example, prostaglandin $F_{2\alpha}$ ($PGF_{2\alpha}$) has the following structure:

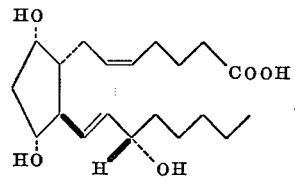

VI

Prostaglandin $F_{2\beta}$ ($PGF_{2\beta}$) has the following structure:

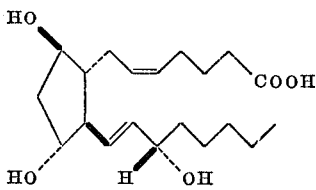

VII

Prostaglandins $F_\alpha$ and $F_\beta$ corresponding to $FGE_1$, $PGE_3$, and dihydro-$PGE_1$ are also known.

In formulas II or VII, broken line attachments to the cyclopentane ring indicate substituents in alpha configuration, i.e., below the plane of the cyclopentane ring. Heavy solid line attachments to the cyclopentane ring indicate substituents in beta configuration, i.e., above the plane of the cyclopentane ring. The side-chain hydroxy at C-15 in formulas II and VII is in S configuration. See Nature, 212, 38 (1966) for discussion of the stereochemistry of the prostaglandins.

Molecules of the known prostaglandins each have several centers of asymmetry, and can exist in racemic (optically inactive) form and in either of the two enantiomeric (optically active) forms, i.e., the dextrorotatory and levorotatory forms. As drawn, formulas II to VII each represent the particular optically active form of the prostaglandin which is obtained from certain mammalian tissues, for example, sheep vesicular glands, swine lung, or human seminal plasma, or by carbonyl and/or double bond reduction of a prostaglandin so obtained. See, for example, Bergstrom et al., cited above. The mirror image of each of formulas II to VII would represent the other entaniomer of that prostaglandin. The racemic form of a prostaglandin would contain equal numbers of both enantiomeric molecules, and one of formulas II to VII and the mirror image of that formula would both be needed to represent correctly the corresponding racemic prostaglandin. For convenience hereinafter, use of the tems $PGE_1$, $PGE_2$, $PGE_3$, dihydro-$PGE_1$, $PGF_{1\alpha}$, $PGF_{2\alpha}$, $PGF_{3\alpha}$, and dihydro-$PGF_{1\alpha}$, will mean the optically active form of that prostaglandin with the same absolute configuration as $PGF_1$ obtained from mammalian tissues. When reference to the racemic form of one of those prostaglandins is intended, the word "racemic" will preceed the prostaglandin name, thus, racemic $PKE_2$ or racemic $PGF_{2\alpha}$.

$PGF_1$, $PGF_2$, $PGF_3$, dihydro-$PGF_1$, and the corresponding $PGF_\alpha$ compounds, and their esters and pharmacologically acceptable salts are extremely potent in causing various biological responses. For that reason, these compounds are useful for pharmacological purposes. See, for example, Bergstrom et al., Pharmacol. Rev. 20, 1 (1968), and references cited therein. A few of those biological responses are systemic arterial blood pressure lowering in the case of the PGE compounds as measured, for example, in anesthetized (pentobarbital sodium) pentolinium-treated rats with indwelling aortic and right heart cannulas; pressor activity, similarly measured, for the $PGF_a$ compounds; stimulation of smooth muscle as shown, for example, by tests on strips of guinea pig ileum, rabbit duodenum, or gerbil colon; potentiation of other smooth muscle stimulants; antilipolytic activity as shown by antagonism of epinephrine-induced mobilization of free fatty acids or inhibition of the spontaneous release of glycerol from isolated rat fat pads; inhibition of gastric secretion in the case of the PGE compounds as shown in dogs with secretion stimulated by food or histamine infusion; activity on the central nervous system; decrease of blood platelet adhesiveness as shown by platelet-to-glass adhesiveness, and inhibition of blood platelet aggregation and thrombus formation induced by various physical stimuli, e.g., arterial injury, and various biochemical stimuli, e.g., ADP, ATP, serotonin, thrombin, and collagen; and in the case of the PGF compounds, stimulation of epidermal proliferation and keratinization as shown when applied in culture to embryonic chick and rat skin segments.

Because of these biological responses, these known prostaglandins are useful to study, prevent, control, or alleviate a wide variety of diseases and undersirable physiological conditions in birds and mammals, including humans, useful domestic animals, pets, and zoological specimens, and in laboratory animals, for example, mice, rats, rabbits, and monkeys.

For example, these compounds, and especially the PGE compounds, are useful in mammals, including man, as nasal decongestants. For this purpose, the compounds are used in a dose range of about 10 μg. to about 10 mg. per ml. of a pharmacologically suitable liquid vehicle or as an aerosol spray, both for topical application.

The PGE compounds are usefu in mammals, including man and certain useful animals, e.g., dogs and pigs, to reduce and control excessive gastric secretion, thereby reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 0.1 μg. to about 500 μg. per keg. of body weight per minute, or in a total daily dose by injection or infusion in the range about 0.1 to about 20 mg. per keg. of body weight per day, the exact dose depending on the age, weight, and condition of the patient or animal, and on the frequency and route of administration.

The PGE and $PGF_a$ compounds are useful whenever it is desired to inhibit platelet aggregation, to reduce the adhesive character of platelets, and to remove or prevent the formation of thrombi in mammals, including man, rabbits, and rats. For example, these compounds are useful in the treatment and prevention of myocardial infarcts, to treat and prevent post-operative thrombosis, to promote patency of vascular grafts following surgery, and to treat conditions such as atherosclerosis, arteriosclerosis, blood clotting defects due to lipemia, and other clinical conditions in which the underlying etiology is associated with lipid imbalance or hyperlipidemia. For these purposes, these compounds are administered systemically, e.g., intravenously, subcutaneously, intramuscularly, and in the form of sterile implants for prolonged action. For rapid response, especially in emergency situations, the intravenous route of administration is preferred. Doses in the range about 0.005 to about 20 mg. per kg. of body weight per day are used, the exact dose depending on the age, weight, and condition of the patient or animal, and on the frequency and route of administration.

The PGE and $PGF_a$ compounds are especially useful as other fluids which are used in artificial extracorporeal additives to blood, blood products, blood substitutes, and other fluids which are used in artificial extracorporeal circulation and perfusion of isolated body portions, e.g., limbs and organs, whether attached to the original body, detached and being preserved or prepared for transplant, or attached to a new body. During these circulations and perfusions, aggregated platelets tend to block the blood vessels and portions of the circulation apparatus. This blocking is avoided by the presence of these compounds. For this purpose, the compound is added gradually or in single or multiple portions to the circulating blood, to the blood of the donor animal, to the perfused body portion, attached or detached, to the recipient, or to two or all of those at a total steady state dose of about .001 to 10 mg. per lier of circulating fluid. It is especially useful to use these compounds in laboratory animals, e.g., cats, dogs, rabbits, monkeys, and rats, for these purposes in order to develop new methods and techniques for organ and limb transplants.

PGE compound are extremely potent in causing stimulation of smooth muscle, and are also highly active in potentiating other known smooth muscle stimulators, for example, oxytocic agents, e.g., oxytocin, and the various ergot alkaloids including derivatives and analogs thereof. Therefore $PGE_1$, for example, is useful in place of or in combination with less than usual amounts of these known smooth muscle stimulators, for example, to relieve the symptons of paralytic ileus, or to control or prevent atonic uterine bleeding after abortion or delivery, to aid in expulsion of the placenta, and during the puerperium. For the latter purpose, the PGE compound is administered by intravenous infusion immediately after abortion or delivery at a dose in the range about 0.01 to about 50 μg. per kg. of body weight per minute until the desired effect is obtained. Subsequent doses are given by intravenous, subcutaneous, or intramuscular injection or infusion during puerperium in the range 0.01 to 2 mg. per kg. of body weight per day, the exact dose depending on the age, weight, and condition of the patient or animal.

The PGE compounds are useful as hypotensive agents to reduce blood pressure in mammals, including man. For this purpose, the compounds are administered by intravenous infusion at the rate about 0.01 to about 50 μg. per kg. of body weight per minute, or in single or multiple doses of about 25 to 500 μg. per kg. of body weight total per day.

The PGE and $PGF_a$ compounds are useful in place of oxytocin to induce labor in pregnant female animals, including man, cows, sheep, and pigs, at or near term, or in pregnant animals with intrauterine death of the fetus from about 20 weeks to term. For this purpose, the compound is infused intravenously at a dose 0.01 to 50 μg. per kg. of body weight per minute until or near the termination of the second stage of labor, i.e., expulsion of the fetus. These compounds are especially useful when the female is one or more weeks post-mature and natural labor has not started, or 12 to 60 hours after the membranes have ruptured and natural labor has not yet started.

The $PGF_a$ and PGE compounds are useful for controlling the reproductive cycle in ovulating female mammals, including humans and animals such as monkeys, rats, rabbits, dogs, cattle, and the like. For that purpose, $PGE_2$ or $PGF_{2a}$, for example, is administered systemically, e.g., intravenously, subcutaneously, and intravaginally, at a dose level in the range 0.001 mg. to about 20 mg. per kg. of body weight of the female mammal, advantageously during a span of time starting approximately at the time of ovulation and ending approximately at the next expected time of menses or just prior to that time.

Additionally, expulsion of an embryo or fetus is accomplished by similar administration of the compound during the first third of the normal mammalian gestation period.

As mentioned above, the PGE compounds are potent antagonists of epinephrine-induced mobilization of free fatty acids. For this reason, these compounds are useful in experimental medicine for both in vitro and in vivo studies in mammals, including man, rabbits, and rats, intended to lead to the understanding, prevention, symtom alleviation, and cure of diseases involving abnormal lipid mobilization and high free fatty acid levels, e.g., diabetes mellitus, vascular diseases, and hyperthyroidism.

SUMMARY OF THE INVENTION

It is a purpose of this invention to provide an improved process for preparing prostaglandin E acids and esters with a methyl or an ethyl substituent at the C-15 position. It is a further purpose to provide novel 11-silylated intermediates useful in said process. It is still a further purpose to provide processes for preparing said intermediates.

The presently described processes and intermediates are useful for preparing 15-methyl and 15-ethyl prostaglandin analogs of the generic formula

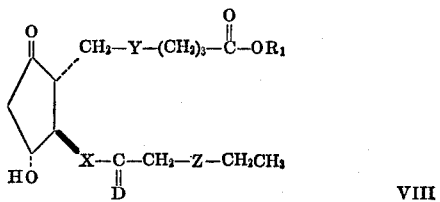

VIII or the racemic compound of that formula and the mirror image thereof, wherein (a) X is trans-CH=CH— or —CH$_2$CH$_2$—, and Y and Z are both —CH$_2$CH$_2$—, or (b) X is trans-CH=CH—, Y is cis-CH=CH—, and Z is —CH$_2$CH$_2$— or cis-CH=CH—; wherein D is

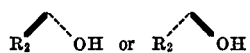

wherein R$_2$ is methyl or ethyl; and wherein R$_1$ is hydrogen or alkyl of one to 8 carbon atoms, inclusive.

Accordingly there is provided a process for producing an optically active compound of the formula:

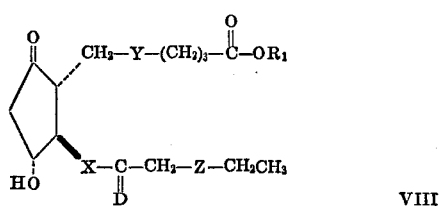

VIII or a racemic compound of that formula and the mirror image thereof, wherein D, R$_1$, X, Y, and Z are as defined above, which comprises the steps, (1) Preparing an optically active compound of the formula:

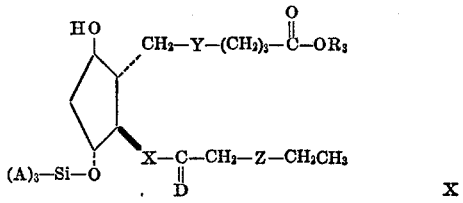

X or a racemic compound of that formula and the mirror image thereof, wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive; wherein R$_3$ is hydrogen, alkyl of one to 8 carbon atoms, inclusive, or —Si—(A)$_3$ wherein A is defined above; and wherein D, X, Y, and Z are as defined above, by reacting an optically active compound of the formula

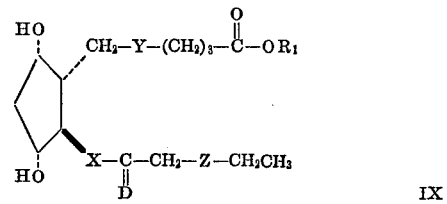

IX or a racemic compound of that formula and the mirror image thereof, wherein D, R$_1$, X, Y, and Z are as defined above, with a silylating agent, (2) Forming an optically active compound of the formula

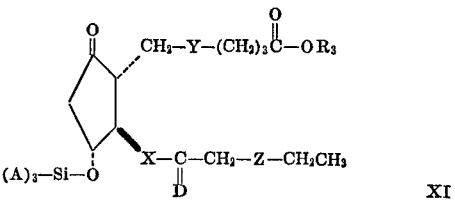

XI or a racemic compound of that formula and the mirror image thereof, wherein R, R$_2$, R$_3$, X, Y, and Z are as defined above, by oxidizing the reaction product of step (1) with a reagent which selectively oxidizes secondary hydroxyl to carbonyl in the presence of carbon-carbon double bonds, and (3) Hydrolyzing the reaction product of step (2).

Included in the formula VIII products are the following compounds: 15-methyl(or ethyl)-PGE$_1$, 15-methyl(or ethyl)-PGE$_2$, 15-methyl(or ethyl)-PGE$_3$, and 15-methyl (or ethyl)-dihydro-PGE$_1$, and their 15β-epimers, and the esters of those compounds within the scope of R$_1$, and the racemic compounds of those compounds and esters and their enantiomorphs.

Included in the formula IX starting materials are the following compounds: 15-methyl(or ethyl)-PGF$_{1\alpha}$, 15-methyl(or ethyl)-PGF$_{2\alpha}$, 15-methyl(or ethyl)-PGF$_{3\alpha}$, and 15-methyl(or ethyl)-dihydro-PGF$_{1\alpha}$, and their 15β-epimers, and the esters of those compounds within the scope of R$_1$, and the racemic compounds of those compounds and esters and their enantiomorphs.

Included in the formula-X PGF-type mono-silyl ethers of this invention are compounds of the following formulas:

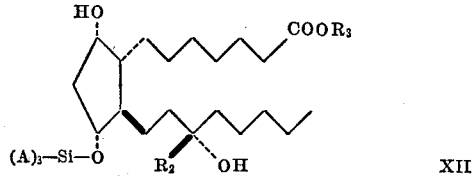

XII

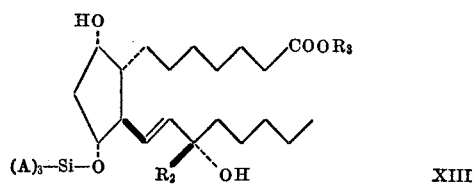

XIII

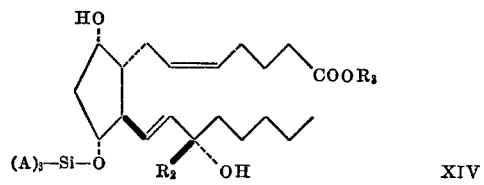

XIV

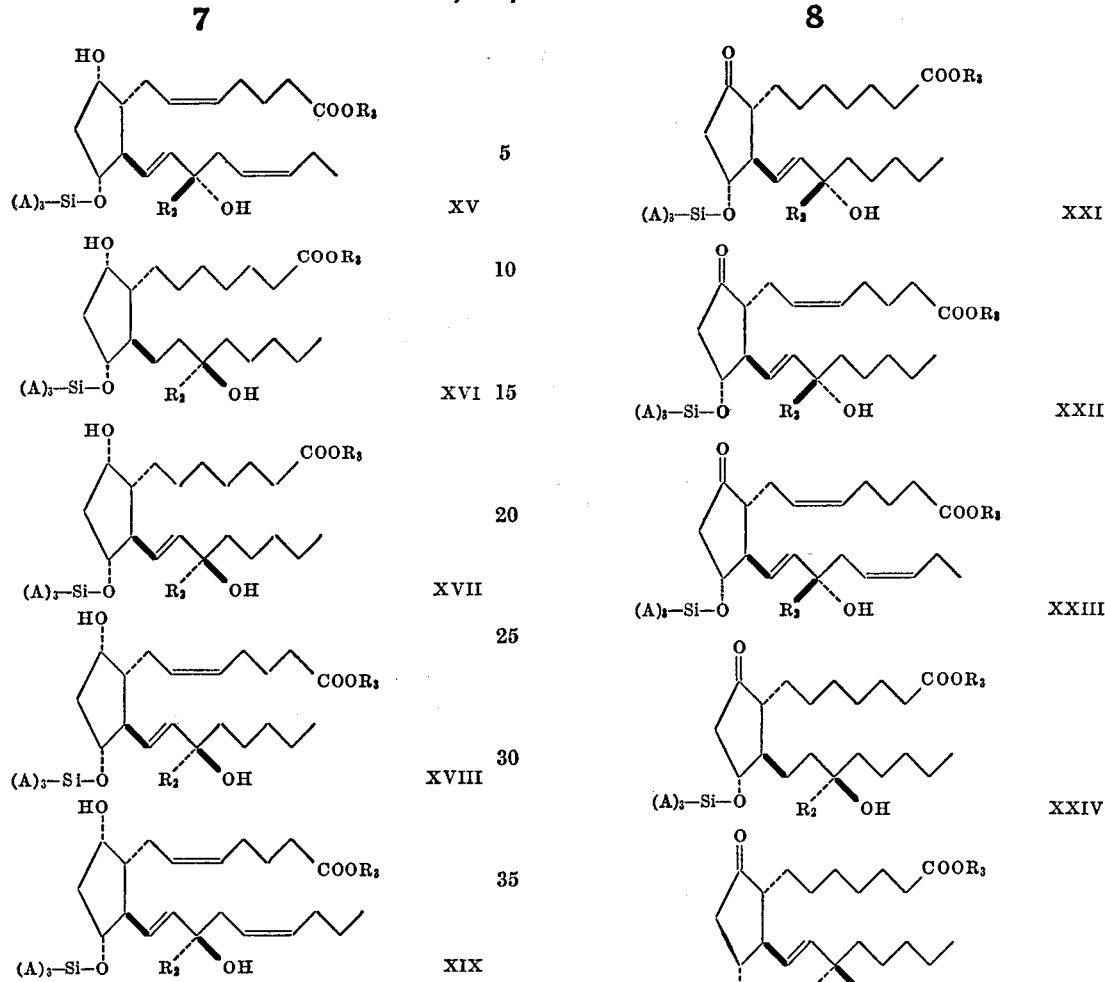

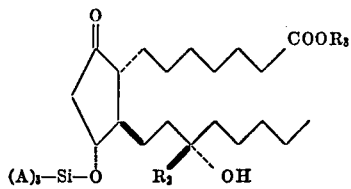

There are also included, within the invention, the racemic compounds of each respective formula and the mirror image thereof. As in the case of formulas II to VII, formulas XII to XV are each intended to represent optically active prostanoic acid derivatives with the same absolute configuration as $PGE_1$ obtained from mammalian tissues. Formulas XVI to XIX represent the corresponding 15-epimers, i.e. those prostanoic acid derivatives having the $\beta$(or R) configuration at C–15. Hereinafter "15$\beta$" refers to the epimeric configuration. Thus, "15$\beta$-15-methyl-$PGF_{2\alpha}$, 11-trimethylsilyl ether" identifies a formula-XVIII compound having the $\beta$(or R) configuration at C–15 rather than the natural $\alpha$(or S) configuration of 15-methyl-$PGF_{2\alpha}$. One of the formulas XII to XIX plus the mirror image of that formula are necessary in combination to describe a racemic compound. For convenience hereinafter, when the word "racemic" (or "dl") precedes the name of one of the novel prostanoic acid derivatives of this invention, the intent is to designate a racemic compound represented by the combination of the appropriate formula XII to XIX and the mirror image of that formula. When the word "racemic" (or "dl") does not precede the compound name, the intent is to designate an optically active compound represented only by the appropriate formula XII to XIX.

Included in the formula-XI PGE-type mono-silyl ethers of this invention are compounds of the following formulas:

There are also included the racemic compounds of the formula-XI PGE-type compounds.

In formulas I–XXVII above as well as in the formulas hereinafter, broken line attachments to a ring or chain represent substituents in alpha configuration, i.e. below the place of the paper.

The formula X-to-XXVII compounds and their racemic compounds of this invention are useful in preparing the above-identified formula VIII compounds by the process disclosed herein. The formula-VII end-products and their racemic compounds each cause the same biological responses described above for the corresponding known prostaglandins. Each of these 15-methyl- and 15-ethyl-PGE-type compounds, and their racemic compounds, is accordingly useful for the above-described pharmacological purposes and is used for those purposes as described above.

Reference to Chart A, herein, will make clear the transformation from the PGF-type compounds IX to the PGE-type compounds VIII by steps 1–3, inclusive. Formulas VIII, IX, X, and XI, hereinafter referred to, are depicted in Chart A, wherein (a) X is trans-CH=CH— or —CH$_2$CH$_2$—, and Y and Z are both —CH$_2$CH$_2$—, or (b) X is trans-CH=CH—, Y is cis-CH=CH—, and Z is —CHCH$_2$— or cis-CH=CH—; wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive; wherein D is

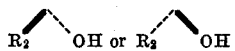

wherein R$_2$ is methyl or ethyl; wherein R$_1$ is hydrogen or alkyl of one to 8 carbon atoms, inclusive; and wherein R$_3$ is hydrogen, alkyl of one to 8 carbon atoms, inclusive, or —Si—(A)$_3$ wherein A is as defined above. The various A's of a —Si—(A)$_3$ moiety are alike or different. For example, an —Si—(A)$_3$ can be trimethylsilyl, dimethylphenylsilyl, or methylphenylbenzylsilyl. Examples of alkyl of one to 4 carbon atoms, inclusive, are methyl, ethyl, propyl, isopropyl, butyl, isobutyl, sec-butyl, and tert-butyl. Examples of aralkyl of 7 to 12 carbon atoms, inclusive, are benzyl, phenethyl, α-phenylethyl, 3-phenylpropyl, α-naphthylmethyl, and 2-(β-naphthyl)ethyl. Examples of phenyl substituted with one or 2 fluoro, chloro, or alkyl of one to 4 carbon atoms, inclusive, are p-chlorophenyl, m-fluorophenyl, o-tolyl, 2,4-dichlorophenyl, p-tert-butylphenyl, 4-chloro-2-methylphenyl, and 2,4-dichloro-3-methylphenyl. Examples of alkyl of one to 8 carbon atoms, inclusive, for R$_1$ are methyl, ethyl, propyl, butyl, pentyl, hexyl, heptyl, octyl, and isomeric forms thereof.

CHART A

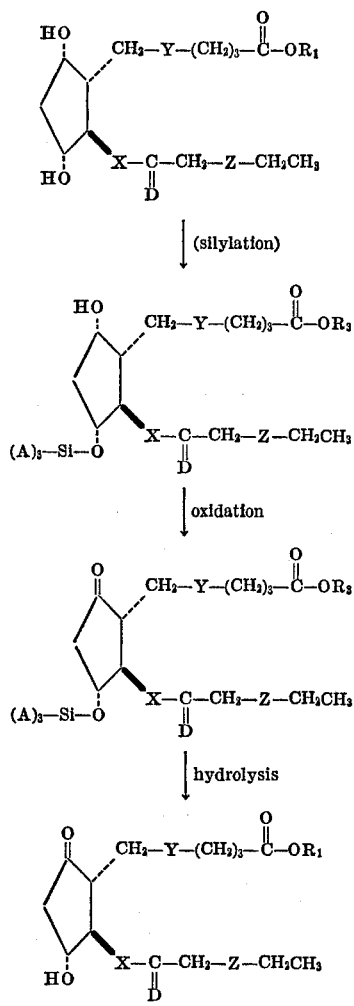

Consider, first, step 1 of Chart A, wherein the formula-IX compounds are selectively silylated at the C–11 position. The 15-methyl and 15-ethyl PGF$_a$ starting materials have three hydroxyl groups in each molecule: C–9, C–11, and C–15. Surprisingly, I have found it possible to silylate substantially only the C–11 hydroxyls, by choice of reagents and conditions. Of the three hydroxyl groups in the IX molecule, two are secondary hydroxyl groups, i.e. they are attached to carbon atoms carrying single hydrogen atoms, and of these, the C–11 hydroxyl groups are preferentially silylated in my process. Silylating agents are known in the art. See, for example, Pierce, "Silylation of Organic Compounds," Pierce Chemical Co., Rockford, Ill. (1968).

I have found that silylating agents of the type (A)$_3$SiN(E)$_2$, i.e. substituted silylamines wherein A is as defined above the E has the same definition as A, being the the same or different, are useful for the above purpose at temperature below about —25° C. A preferred temperature range is about —35° to —50°. At higher temperatures some silylation of C–9 hydroxyl groups as well as the C–11 hydroxyl groups occurs, whereas at lower temperatures the rate of silylation is undesirably slow. Examples of the silylamine type silylating agents suitable for forming the formula-X intermediates having (A)$_3$—Si— groups within the scope of this invention include pentamethylsilylamine,
pentaethylsilylamine,
N-trimethylsilyldiethylamine,
1,1,1-triethyl-N,N-dimethylsilylamine,
N,N-diisopropyl-1,1,1-trimethylsilylamine,
1,1,1,-tributyl-N,N-dimethylsilylamine,
N,N-dibutyl-1,1,1-trimethylsilylamine,
1-isobutyl-N,N,1,1,-tetramethylsilylamine,
N-benzyl-N-ethyl-1,1,1,-trimethylsilylamine,
N,N,1,1-tetramethyl-1-phenylsilylamine,
N,N-diethyl-1,1-dimethyl-1-phenylsilylamine,
N,N-diethyl-1-1methyl-1,1-diphenylsilylamine,
N,N-dibutyl-1,1,1-triphenylsilylamine, and
1-methyl-N,N,1,1-tetrahphenylsilylamine.

The reaction is carried out with exclusion of atmospheric moisture, for example, for example under a nitrogen atmosphere. It is conveniently done in a solvent such as acetone or dichloromethane, although the silylating agent itself, when used in excess, may also serve as a liquid medium for the reaction. The reaction ordinarily is completed in a few hours, and should be terminated when the C–11 hydroxyl groups are silylated to avoid side reactions. The progress of the reaction is conveniently monitored by thin-layer chromatography (TLC), utilizing methods known in the art.

I have further discovered that trisubstituted monochlorosilanes such as chlorotriphenylsilane will yield formula-X 11-substituted intermediates within the scope of this invention under suitable conditions of temperature and time of reaction. For the above purpose, these reagents are used in the presence of a tertiary base such as pyridine at temperatures of or below 25° C., preferably in the range of about 0° to +25° C. Examples of the trisubstituted monochlorosilanes suitable for this purpose include chlorotriethylsilane, chlorotriisobutylsilane, chlorotriphenylsilane, chlorotris(p-chlorophenyl)silane, chloro-tri-m-tolylsilane, and tribenzylchlorosilane. As in using the silylamines above, the progress of the reaction is monitored by TLC and the conditions for optimized 11-silylation are determined by experimentation.

For either of the above types of silylating agents, an excess of the reagent over that stoichiometrically required is used, preferably at least a four-fold excess. When R$_1$ in the formula-IX starting material is hydrogen the —COOH moiety thereby defined may be partially or even completely transformed to —COO—Si—(A)$_3$, additional silylating agent being used for this purpose. Whether or not this occurs is immaterial for the success of my process, since —COOH groups are not changed by the subsequent steps and —COO—Si—(A)₃ groups are easily hydrolyzed to —COOH groups.

Consider, next, step 2 of Chart A, wherein the formula-X 11-silylated intermediate is oxidized to compound XI. Oxidation reagents useful for this transformation are known to the art. An especially useful reagent for this purpose is the Collins reagent, i.e. chromium trioxide in pyridine. See J. C. Collins et al., Tetrahedron Lett., 3363 (1968). Dichloromethane is a suitable diluent for this purpose. A slight excess of the oxidant beyond the amount necessary to oxidize the C-9 secondary hydroxy group of the formula-X intermediate is used. Reaction temperatures of below 20° C. should be used. Preferred reaction temperatures are in the range —10° to +10° C. The oxidation proceeds rapidly and is usually complete in about 5 to 20 minutes. The formula-VIII 15-alkyl PGE-type product is isolated by conventional methods.

Examples of other oxidation reagents useful for this transformation are silver carbonate on Celite (Chem. Commun., 1102 (1969)), mixtures of chromium trioxide and pyridine (J. Am. Chem. Soc., 75, 422 (1953), and Tetrahedron, 18, 1351 (1962)), t-butylchromate in pyridine (Biochem. J., 84, 195 (1962)), mixtures of sulfur trioxide in pyridine and dimethylsulfoxide (J. Am. Chem. Soc., 89, 5505 (1967)), and mixtures of dicyclohexylcarbodiimide and dimethyl sulfoxide (J. Am. Chem. Soc., 87, 5661 (1965)).

Finally in step 3 of Chart A, all silyl groups of the formula-XI intermediates are removed by hydrolysis, thereby forming the formula-VII PGE-type products. These hydrolyses are carried out by prior art procedures known to be useful for transforming silyl ethers and silyl esters to alcohols and carboxylic acids, respectively. See, for example, Pierce, cited above, especially p. 447 thereof. A mixture of water and sufficient of a water-miscible organic diluent to give a homogeneous hydrolysis reaction mixture represents a suitable reaction medium. Addition of a catalytic amount of an organic or inorganic acid hastens the hydrolysis. The length of time required for the hydrolysis is determined in part by the hydrolysis temperature. With a mixture of water and methanol at 25° C., several hours is usually sufficient for hydrolysis. At 0° C., several days is usually necessary.

The 15-methyl and 15-ethyl prostaglandin analogs of formula-IX in Chart A are not the subject of this invention. Their preparation from PGF$_\alpha$-type compounds, following the steps of Chart B, is illustrated below under "Preparations." Therein the term "15-oxo-" in front of a compound name, e.g., 15-oxo-PGF$_{1\alpha}$, refers to a prostaglandin analog wherein the moiety

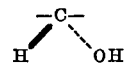

at the 15-position has been transformed to

The initial optically active reactants of formula XXVIII in Chart B, i.e., PGF$_{1\alpha}$, PGF$_{2\alpha}$, PGF$_{3\alpha}$, and dihydro-PGF$_{1\alpha}$ and their alkyl esters are known in the art or are prepared by methods known in the art. See, for example, Bergstrom et al., cited above, U.S. Pat. No. 3,069,322, and British Specification No. 1,040,544. The initial racemic reactants of formula XXVIII in Chart B, i.e., racemic PGF$_{1\alpha}$, racemic PGF$_{2\alpha}$ and racemic PGF$_{3\alpha}$ and their alkyl esters are known in the art or are prepared by methods known in the art. See, for example, Just et al., Journal of the American Chemical Society, 91, 5364 (1969), Corey et al., Journal of the American Chemical Society, 90, 3245 (1968), Schneider et al., Chemical Communications (Great Britain), 304 (1969), and Axen, Chemical Communications, 602 (1970).

Racemic dihydro-PGF$_{1\alpha}$ and its esters are prepared by catalytic hydrogenation of the corresponding racemic PGF$_{1\alpha}$ or PGF$_{2\alpha}$ compounds, for example, in the presence of 5% palladium-on-charcoal catalyst in ethyl acetate solution at 25° C. and one atmosphere pressure of hydrogen.

These known acids and esters of formula XXVIII are transformed to the corresponding intermediate 15-oxo acids and esters of formula XXIX, respectively, by oxidation with reagents such as 2,3-dichloro-5,6-dicyano-1,4-

CHART B

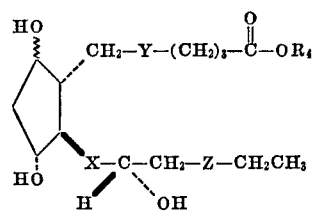

XXVIII

↓ (oxidation)

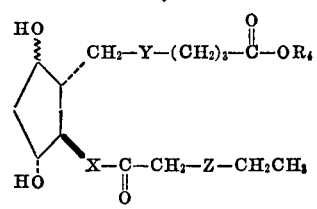

XXIX

↓ (silylation)

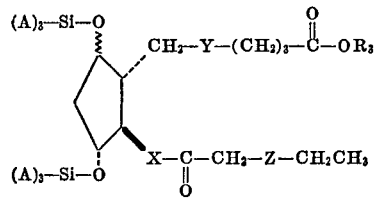

XXX

↓ R₂MgX

↓ (hydrolysis)

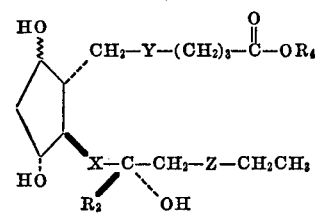

IXα

+

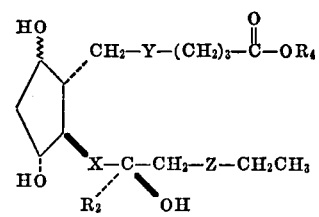

IXβ benzoquinone, activated manganese dioxide, or nickel peroxide (see Fieser et al., "Reagents for Organic Synthesis," John Wiley and Sons, Inc., New York, N.Y., pp. 215, 637 and 731). Alternatively, and especially for the formula XXVIII reactants wherein X, Y, and Z are all

—CH₂CH₂— these oxidations are carried out by oxygenation in the presence of the 15-hydroxyprostaglandin dehydrogenase of swine lung (see Arkiv för Kemi, 25, 293 (1966)). These reagents are used according to procedures known in the art. See, for example, J. Biol. Chem., 239, 4097 (1964).

Referring again to Chart B, the intermediate compound of formula XXIX is transformed to a silyl derivative of formula XXX by procedures known in the art. See, for example, Pierce, "Silylation of Organic Compounds," Pierce Chemical Co., Rockford, Ill. (1968). Both hydroxy groups of the formula XXIX-reactant are thereby transformed to —O—Si—(A)$_3$ moieties wherein A is as defined above, and sufficient of the silylating agent is used for that purpose according to known procedures. When R$_1$ in the formula-XXIX intermediate is hydrogen, the —COOH moiety thereby defined is simultaneously transformed to —COO—Si—(A)$_3$, additional silylating agent being used for this purpose. This latter transformation is aided by excess silylating agent and prolonged treatment. When R$_1$ in formula XXIX is alkyl, then R$_4$ in formula XXX will also be alkyl. The necessary silylating agents for these transformations are known in the art or are prepared by methods known in the art. See, for example, Post, "Silicones and Other Organic Silicon Compounds," Reinhold Publishing Corp., New York, N.Y. (1949).

Referring again to Chart B, the intermediate silyl compound of formula XXX is transformed to the final compounds of formula IX$\alpha$+1X$\beta$ by first reacting the silyl compounds with a Grignard reagent of the formula R$_2$MgX wherein R$_2$ is methyl or ethyl, and X is chloro, bromo, or iodo. For this purpose, it is preferred that X be bromo. This reaction is carried out by the usual procedure for Grignard reactions, using diethyl ether as a reaction solvent and saturated aqueous ammonium chloride solution to hydrolyze the Grignard complex. The resulting disilyl or trisilyl tertiary alcohol is then hydrolyzed with water to remove the silyl groups. For this purpose, it is advantageous to use a mixture of water and sufficient of a water-miscible solvent, e.g., ethanol to give a homogenous reaction mixture. The hydrolysis is usually complete in 2 to 6 hours at 25° C., and is preferably carrried out in an atmosphere of an inert gas, e.g., nitrogen or argon.

The mixture of 15-S and 15-R isomers obtained by this Grignard reaction and hydrolysis is separated by procedures known in the art for separating mixtures of prostanoic acid derivatives, for example, by chromatograhy on neutral silica gel. In some instances, the lower alkyl esters, especially the methyl esters of a pair of 15-S and 15-R isomers are more readily separated by silica gel chromatography than are the corresponding acids. In those cases, it is advantageous to esterify the mixture of acids as described below, separate the two esters, and then, if desired, saponify the esters by procedures known in the art for saponification of prostaglandins F.

Although formula IX$\alpha$ and 1X$\beta$ compounds wherein X and Y are both —CH$_2$CH$_2$— are produced according to the processes of Chart B, it is preferred to produce those novel dihydro-PGF$_1$ analogs by hydrogenations of one of the corresponding unsaturated compounds, i.e., a compound of formula IX$\alpha$ and IX$\beta$ where X is trans-CH=CH— and Y is —CH$_2$CH$_2$— or cis-CH=CH—.

This hydrogenation is advantageously carried out catalytically, for example, in the presence of a 5% palladium-on-charcoal catalyst in ethyl acetate solution at 25° C. and one atmosphere pressure of hydrogen.

As discussed above, the processes of Charts A and B lead either to acids (R$_1$ is hydrogen) or to alkyl esters (R$_1$ is alkyl of one to 8 carbon atoms, inclusive). When a formula-IX$\alpha$ or IX$\beta$ PGF-type acid (Chart B) or a formula-VIII PGE-type acid (Chart A) has been prepared and an alkyl ester is desired, esterification is advantageously accomplished by interaction of the acid with appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydocarbon in a suitable inert solvent, preferably diethyl ether, with the acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley and Sons, Inc., New York, N.Y., Vol. 8, pp. 389–394 (1954).

An alternative method for esterification of the carboxyl moiety of the PGF-type compounds comprises transformation of the free acid to the corresponding silver salt, followed by interaction of that salt with an alkyl iodide. Examples of suitable iodides are methyl iodide, ethyl iodide, butyl iodide, isobutyl iodide, tert-butyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

DESCRIPTION OF THE PREFERRED EMBODIMENTS

The invention can be more fully understood by the following examples.

All temperatures are in degrees centigrade.

Infrared absorption spectra are recorded on a Perkin-Elmer model 421 infrared spectrophotometer. Undiluted (neat) samples of the liquids and oils are used. Mineral oil (Nujol) mulls of the solids are used.

NMR spectra are recorded on a Varian A–60 spectrophotometer with tetramethylsilane as an internal standard (downfield) and using solvents as indicated below.

Mass spectra are recorded on an Atlas CH–4 mass septrometer with a TO–4 source (ionization voltage 70 ev.).

"Brine," herein, refers to an aqueous saturated sodium chloride solution.

PREPARATION 1

15-Oxo-PGF$_{1\alpha}$ 2,3-Dichloro-5,6-dicyano-1,4-benzoquinone (463 mg.) is added to a solution of PGF$_{1\alpha}$ (600 mg.) in 30 ml. of dioxane. The mixture is stirred 24 hours at 50° C. under nitrogen, and then is cooled to 20° C. and filtered. The filtered solids are washed with dichloromethane. Evaporation of the combined filtrate and washings at reduced pressure gives 650 mg. of a residue which is chromatographed on 150 g. of silcia gel (Silicar CC-4; Mallincrodt), eluting with 50% ethyl acetate in Skellysolve B (a mixture of isomeric hexanes). Evaporation of the eluates gives 545 mg. of 15-oxo-PGF$_{1\alpha}$; infrared absorption at 3400, 2660, 1700, 1660, 1630, 1460, 1410, 1375, 1285, 1250, 1185, 1120, 1070, and 980 cm.$^{-1}$.

PREPARATION 2

15-Oxo-PGF$_{2\alpha}$

Following the procedure of Preparation 1, PGF$_{2\alpha}$ is oxidized to 15-oxo-PGF$_{2\alpha}$; infrared absorption at 3400, 2660, 1705, 1660, 1625, 1405, 1375, 1320, 1290, 1245–1225, 1215–1175, 1115, 1075, 1050, and 980 cm.$^{-1}$.

PREPARATION 3

15-Oxo-PGF$_{3\alpha}$

Following the procedure of Preparation 1, PGF$_{3\alpha}$ is oxidized to 15-oxo-PGF$_{3\alpha}$.

Also following the procedure of Preparation 1, the methyl, ethyl, tert-butyl, and 2-ethylhexyl esters of PGF$_{1\alpha}$, PGF$_{2\alpha}$, and PGF$_{3\alpha}$ are each oxidized to the corresponding 15-oxo compounds.

Also following the procedure of Preparation 1, the racemic forms of PGF$_{1\alpha}$, PGF$_{2\alpha}$, PGF$_{3\alpha}$ and the methyl, ethyl, tert-butyl, and 2-ethylhexyl esters of each of those are each oxidized to the corresponding racemic 15-oxo compound.

PREPARATION 4

Dihydro-15-Oxo-PGF$_{1\alpha}$

Following the procedure of Arkiv för Kemi, 25, 293 (1966), dihydro-PGF$_{1\alpha}$ is oxidized to dihydro-15-oxo-PGF$_{1\alpha}$ with the 15-hydroxyprostaglandin dehydrogenase enzyme of swine lung.

Also following the procedure of Preparation 4, the methyl, ethyl tert-butyl, and 2-ethylhexyl esters of dihydro-PGF$_{1\alpha}$ ar each oxidized to the corresponding 15-oxo compounds.

Also following the procedure of Preparation 4, the racemic forms of dihydro-PGF$_{1\alpha}$ and its methyl, ethyl, tert-butyl, and 2-ethylhexyl esters are each oxidized to the corresponding racemic 15-oxo compound.

PREPARATION 5

Tris-(Trimethylsilyl) Derivatives of 15-Oxo-PGF$_{1\alpha}$

A mixture of hexamethyldisilazane (11 ml.) and trimethylchlorosilane (2.2 ml.) is added to a solution of 15-oxo-PGF$_{1\alpha}$ (545 mg.) in 55 ml. of tetrahydrofuran. This mixture is stirred 16 hours at 25° C. under nitrogen, and is then filtered. The filtrate is evaporated under reduced pressure. Xylene (50 ml.) is added to the residue and the mixture is evaporated at 60° C. under reduced pressure. This addition of xylene and evaporation is repeated twice. The resulting residue is the tris-(trimethylsilyl) derivative of 15-oxo-PGF$_{1\alpha}$; infrared absorption at 1365, 1250, and 1180 cm.$^{-1}$.

PREPARATION 6

Tris-(Trimethylsilyl) Derivative of 15-Oxo-PGF$_{2\alpha}$

Following the procedure of Preparation 5, 15-oxo-PGF$_{2\alpha}$ is transformed to the tris(trimethylsilyl) derivative; infrared absorption at 1725, 1680, 1635, 1250, and 845 cm.$^{-1}$.

PREPARATION 7

Tris-(Trimethylsilyl) Derivative of 15-Oxo-PGF$_{3\alpha}$

Following the procedure of Preparation 5, 15-oxo-PGF$_{3\alpha}$ is transformed to the tris-(trimethylsilyl) derivative.

PREPARATION 8

Tris-(Trimethylsilyl) Derivative of Dihydro-15-Oxo-PGF$_{1\alpha}$

Following the procedure of Preparation 5, dihydro-15-oxo - PGF$_{1\alpha}$ is transformed to the tris - (trimethylsilyl) derivative.

Following the procedure of Preparation 5, the methyl, ethyl, tert-butyl, and 2-ethyl-hexyl esters of 15-oxo-PGF$_{1\alpha}$, 15-oxo-PGF$_{2\alpha}$, 15-oxo-PGF$_{3\alpha}$, and dihydro-15-oxo-PGF$_{1\alpha}$ are each transformed to the corresponding bis-(trimethylsilyl) derivative.

Also following the procedure of Preparation 5, the racemic forms of 15-oxo-PGF$_{2\alpha}$, 15-oxo-PGF$_{3\alpha}$, dihydro-15-oxo-PGF$_{1\alpha}$, and the methyl, ethyl, tert-butyl, and 2-ethylhexyl esters of each of those are each transformed to trimethylsilyl derivatives, the acids to tris derivatives and the esters to bis derivative.

PREPARATION 9

15-Methyl-PGF$_{1\alpha}$ and 15-Methyl-15(R)-PGF$_{1\alpha}$

A 3 molar diethyl ether solution of methylmagnesium bromide (0.55 ml.) is added dropwise to a stirred solution of the tris-(trimethylsilyl) derivative of 15-oxo-PGF$_{1\alpha}$ (850 mg.) in 25 ml. of diethyl ether at 25° C. The mixture is stirred 30 min. at 25° C., after which are an additional 0.2 ml. of the methylmagnesium bromide solution is added and stirring is continued an additional 30 min. The resulting reaction mixture is poured into 75 ml. of saturated aqueous ammonium chloride solution at 0° C. After stirring several minutes, the mixture is extracted repeatedly with diethyl ether. The combined diethyl ether extracts are washed with brine and then dried with anhydrous sodium sulfate. Evaporation of the diethyl ether gives a yellow oil (910 mg.) which is dissolved in 45 ml. of ethanol. That solution is diluted with 30 ml. of water, and the mixture is stirred 4 hrs. at 25° C. The ethanol in the resulting solution is evaporated at reduced pressure, and the aqueous residue is saturated with sodium chloride and then extracted with ethyl acetate. The extract is washed with brine, dried with anhydrous sodium sulfate, and concentrated under reduced pressure to give 640 mg. of a mixture of 15-methyl-PGF$_{1\alpha}$ and 15-methyl-15(R)-PGF$_{1\alpha}$; infrared absorption at 3280, 2600, and 1710 cm.$^{-1}$.

The mixture of 15-methyl-PGF$_{1\alpha}$ and 15-methyl-15(R)-PGF$_{1\alpha}$ is dissolved in 50 ml. of diethyl ether and cooled to 0° C. Excess diazomethane dissolved in diethyl ether is then added, and the mixture is maintained 5 min. at 0° C. and then 5 min. at 25° C. The solution is concentrated in a stream of nitrogen, and the residue is chromatographed on 550 g. of neutral silica, eluting with 75% ethyl acetate in Skellysolve B. Evaporation of eluate fractions gives, successively, 127 mg. of 15-methyl-15(R)-PGF$_{1\alpha}$ methyl ester, 150 mg. of a mixture of 15-methyl-15(R)-PGF$_{1\alpha}$ methyl ester and 15-methyl-PGF$_{1\alpha}$ methyl ester, and 228 mg. of 15-methyl-PGF1$_{1\alpha}$ methyl ester. The latter crystallizes on standing; m.p. 72–75° C.; mass spectral molecular ion peaks at 366, 348, 317, 313, and 294.

Aqueous potassium hydroxide solution (45%; 0.9 ml.) is added to a solution of 15-methyl-PGF$_{1\alpha}$ methyl ester (228 mg.) in a mixture of 6.8 ml. of methanol and 2.2 ml. of water under nitrogen. The resulting solution is stirred 2 hrs. at 25° C., and is then poured into several volumes of water. The aqueous mixture is extracted with ethyl acetate, acidified with 3 N hydrochloric acid, saturated with sodium chloride, and then extracted repeatedly with ethyl acetate. The latter ethyl acetate extracts are combined, washed successively with water and brine, dried with anhydrous sodium sulfate, and concentrated under reduced pressure. The crystalline residue is recrystallized from a mixture of ethyl acetate and Skellysolve B to give 15-methyl-PGF$_{1\alpha}$; m.p. 81–83° C.; infrared absorption at 3410, 3300, 2650, 1705, 1305, 1290, 1275, 1255, 1220, 1195, 1125, 1075, 980 and 915 cm.$^{-1}$; NMR peaks (dimethylformamide) at 5.5 and 4.4–3.6 (multipet) δ; mass spectral molecular ion peaks at 643, 587, and 568.

Following the above procedure, 15-methyl-15(R)-PGF$_{1\alpha}$ methyl ester is saponified to 15-methyl-15(R)-PGF$_{1\alpha}$; infrared absorption at 3380, 2650, 1710, 1460, 1410, 1375, 1275–1200, 1075, 1040 and 975 cm.$^{-1}$; NMR peaks (dimethylformamide) at 5.50 and 4.40–3.60 (multiplet) δ; mass spectral molecular ion peaks at 352, 334, 416, and 263.

PREPARATION 10

15-Methyl-PGF$_{2\alpha}$ and 15-Methyl-15(R)-PGF$_{2\alpha}$

Following the procedure of Preparation 9, the tris-(trimethylsilyl) derivative of 15-oxo-PGF$_{2\alpha}$ (500 mg.) is transformed first to a mixture of 15-methyl-PGF$_{2\alpha}$ and 15-methyl-15(R)-PGF$_{2\alpha}$, and then to the corresponding mixture of methyl esters. This methyl ester mixture (520 mg.) is chromatographed on 500 g. of neutral silica gel (Merck), eluting successively with 2 l. of 20%, 6 l. of 40%, and 8 l. of 50% ethyl acetate in Skellysolve B. The corresponding eluates emerging from the colume are discarded. Elution is continued successively with gradients of 4 l. of 50% and 4 l. of 60% ethyl acetate in Skellysolve B, and 5 l. of 60% and 5 l. of 75% ethyl acetate in Skellysolve B, and then with 4 l. of 75% ethyl acetate in Skellysolve B, collecting the corresponding eluates in 500-ml. fractions. Elution is further continued successively with 5 l. of 75% ethyl acetate in Skellysolve B and with 6 l. of 100% ethyl acetate, collecting the corresponding eluates in 200-ml. fractions. Eluate fractions 29-35 are combined and evaporated to give 109 mg. of 15-methyl-15(R)-PGF$_{2\alpha}$ methyl ester. Eluate fractions 39-67 are combined and evaporated to give 155 mg. of 15-methyl-PGF$_{2\alpha}$ methyl ester.

Following the procedure of Preparation 9, 15-methyl-PGF$_{2\alpha}$ methyl ester is saponified to give 15-methyl-PGF$_{2\alpha}$; infrared absorption at 3260, 2600, 1710, 1365, 1235, 1040, and 970 cm.$^{-1}$; NMR peaks (deuterochloroform) at 5.82, 5.65-5.15 (multiplet), and 4.2-3.8$\delta$; mass spectral molecular ion peaks at 350, 332, and 314.

Also following the procedure of Preparation 9, 15-methyl-15(R)-PGF$_{2\alpha}$ methyl ester is saponified to 15-methyl-15(R)-PGF$_{2\alpha}$; infrared absorption at 3250, 2600, 1710, 1235, 1040, and 970 cm.$^{-1}$; NMR peaks (deuterochloroform) at 6.15 (singlet), 4.20-3.8 (multiplet), and 0.90 (triplet).

PREPARATION 11

15-Methyl-PGF$_{3\alpha}$ and 15-Methyl-15(R)-PGF$_{3\alpha}$

Following the procedure of Preparation 9, the tris-(trimethylsilyl) derivative of 15-oxo-PGF$_{3\alpha}$ is reacted with methylmagnesium bromide, and the product is hydrolyzed to give a mixture of 15-methyl-PGF$_{3\alpha}$ and 15-methyl-15(R)-PGF$_{3\alpha}$. This mixture is converted to the corresponding mixture of methyl esters which are separated by chromatography and saponified to give 15-methyl-PGF$_{3\alpha}$ and 15-methyl-15(R)-PGF$_{3\alpha}$ as described in Preparation 9.

PREPARATION 12

Dihydro-15-Methyl-PGF$_{1\alpha}$ and Dihydro-15-Methyl-15(R)-PGF$_{1\alpha}$

Following the procedure of Preparation 9, the tris-(trimethylsilyl) derivative of dihydro-15-oxo-PGF$_{1\alpha}$ is reacted with methylmagnesium bromide, and the product is hydrolyzed to give a mixture of dihydro-15-methyl-PGF$_{1\alpha}$ and dihydro-15-methyl-15(R)-PGF$_{1\alpha}$. This mixture is converted to the corresponding mixture of methyl esters which are separated by chromatography and saponified as described in Preparation 9.

Following the procedure of Preparation 9, the methyl, ethyl, tert-butyl, and 2-ethyl-hexyl esters of the bis-(trimethylsilyl) derivatives of 15-oxo-PGF$_{1\alpha}$, 15-oxo-PGF$_{2\alpha}$, 15-oxo-PGF$_{3\alpha}$, and dihydro-15-oxo-PGF$_{1\alpha}$ are each transformed to the corresponding 15-methyl and 15-methyl-15(R) esters.

Also following the procedure of Preparation 9, the racemic forms of the trimethylsilyl derivatives of 15-oxo-PGF$_{1\alpha}$, 15-oxo-PGF$_{2\alpha}$, 15-oxo-PGF$_{\alpha 3}$, dihydro-15-oxo-PGF$_{1\alpha}$, and the methyl, ethyl, tert-butyl, and 2-ethylhexyl esters of each of those, tris derivatives of the acids and bis derivatives of the esters, are each transformed to the corresponding 15-methyl and 15-methyl-15(R) acid or ester.

Also following the procedure of Preparation 9 but using ethylmagnesium bromide in place of the methylmagnesium bromide, the tris-(trimethylsilyl), tris-(triphenylsilyl), and the tris-(tribenzylsilyl) derivatives of 15-oxo-PGF$_{1\alpha}$, 15-oxo-PGF$_{2\alpha}$, 15-oxo-PGF$_{3\alpha}$, dihydro-15-oxo-PGF$_{1\alpha}$, and the racemic forms of each of those optically active acids, and also the bis-(trimethylsilyl), bis-(triphenylsilyl), and bis(tribenbzylsilyl) derivatives of the methyl, ethyl, tert-butyl, and 2-ethylhexyl esters of each of those optically active and racemic acids are each transformed to the corresponding 15-ethyl and 15-ethyl-15(R) acid acid or ester.

EXAMPLE 1

15-Methyl-PGF$_{2\alpha}$, 11-trimethylsilyl ether, methyl ester (formula X: A is methyl, D is

R$_3$ is methyl, X is trans-CH=CH—, Y is cis-CH=CH—, and Z is —CH$_2$CH$_2$—).

N-Trimethylsilyldiethylamine ("TMSDEA") (2 ml.) is added slowly to a mixture of 15-methyl-PGF$_{2\alpha}$ methyl ester (Preparation 10, 0.5 g.) and 20 ml. of acetone previously cooled to —45° C., and kept under nitrogen. Progress of the reaction is monitored by thin-layer chromatography (TLC). The reaction temperature is maintained at —40 to —45° C. for 1 hr. whereupon the mixture is diluted with 80 ml. of diethyl ether (previously cooled to —78° C.). The solution is washed with 200 ml. of cold saturated sodium bicarbonate solution. The ether extract is washed with brine, dried over sodium sulfate, and concentrated to yield the titled compound, a light yellow oil, 0.6 g. crystallizing on standing, m. 33-35° C.; infrared absorption at 3400, 2900, 1730, 1430, 1360, 1240, 1140-1200, 970, 830-900 cm.$^{-1}$; NMR peaks at 0.1, 0.7-2.8 (multiplet), 1.3, 3.7, 3.8-4.3 (multiplet) and 5.2-5.7 (multiplet) $\delta$; mass spectral peaks at 439, 436, 418, and 383.

Following the procedure of Example 1, but replacing 15-methyl-PGF$_{2\alpha}$ methyl ester with 15-methyl-PGF$_{2\alpha}$ and its ethyl, tert-butyl, and 2-ethylhexyl esters, there are obtained:

15-methyl-PGF$_{2\alpha}$, 11-trimethylsilyl ether;
15-methyl-PGF$_{2\alpha}$, 11-trimethylsilyl ether, ethyl ester;
15-methyl-PGF$_{2\alpha}$, 11-trimethylsilyl ether, tert-butyl ester; and
15-methyl-PGF$_{2\alpha}$, 11-trimethylsilyl ether, 2-ethylhexyl ester.

Following the procedure of Example 1, but replacing 15-methyl-PGF$_{2\alpha}$ methyl ester with 15-ethyl -PGF$_{2\alpha}$ and its methyl, ethyl, tert-butyl, and 2-ethylhexyl esters, there are obtained:

15-ethyl-PGF$_{2\alpha}$, 11-trimethylsilyl ether;
15-ethyl-PGF$_{2\alpha}$, 11-trimethylsilyl ether, ethyl ester;
15-ethyl-PGF$_{2\alpha}$, 11-trimethylsilyl ether, tert-butyl ester; and
15-ethyl-PGF$_{2\alpha}$, 11-trimethylsilyl ether, 2-ethylhexyl ester.

Following the procedure of Example 1, but replacing 15-methyl-PGF$_{2\alpha}$ methyl ester with the free acids, methyl esters, ethyl esters, tert-butyl esters, and 2-ethylhexyl esters of 15-methyl-PGF$_{1\alpha}$, 15-methyl-PGF$_{3\alpha}$, 15-methyl-dihydro-PGF$_{1\alpha}$, 15 - ethyl - PGF$_{1\alpha}$, 15-ethyl-PGF$_{3\alpha}$, and 15-ethyl-dihydro-PGF$_{1\alpha}$, there are obtained the corresponding 11-trimethylsilyl ethers of those PGF-type compounds.

Following the procedure of Example 1, but replacing N - trimethysilyldiethylamine with pentaethylsilylamine, 1,1,1-tributyl-N,N-dimethylsilylamine, and N,N,1,1-tetramethyl-1-phenylsilylamine, there are obtained the corresponding 11-silyl ethers of 15-methyl-PGF$_{2\alpha}$, methyl ester, namely:

15-methyl-PGF$_{2\alpha}$, 11-triethylsilylether, methyl ester;
15-methyl-PGF$_{2\alpha}$, 11-tributylsilyl ether, methyl ester; and
15-methyl-PGF$_{2\alpha}$, 11-dimethylphenylsilyl ether, methyl ester.

Also following the procedure of Example 1 but using in combination each of the above substituted silylamine silylating agents with each of the free acids, methyl esters, ethyl esters, tert-butyl esters, and 2-ethylhexyl esters of 15-methyl-PGF$_{1\alpha}$, 15-methyl-PGF$_{2\alpha}$, 15-methyl-PGF$_{3\alpha}$, 15 - methyl - dihydro - PGF$_{1\alpha}$, 15-ethyl-PGF$_{1\alpha}$, 15-ethyl-PGF$_{2\alpha}$, 15-ethyl-PGF$_{3\alpha}$, and 15-ethyl-dihydro-PGF$_{1\alpha}$, there are obtained the corresponding 11-silyl ethers of those compounds.

Also following the procedure of Example 1 but using the silylating agents of and following that example with the racemic forms of the PGF-type compounds of and following that example, there are obtained the corresponding 11-silyl ethers of those racemic compounds, for example the 11-trimethylsilyl ethers of dl-15-methyl-PGF$_{1\alpha}$, dl-15-methyl-PGF$_{2\alpha}$ methyl ester, dl-15-ethyl-PGF$_{3\alpha}$ tert-butyl ester, and dl-15-ethyl-dihydro-PGF$_{1\alpha}$ 2-ethylhexyl ester.

EXAMPLE 2

15-Methyl-PGF$_{2\alpha}$, 11-trimethylsilyl ether, methyl ester (formula XI: A is methyl, D is

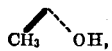

R$_3$ is methyl, X is trans-CH=CH—, Y is cis-CH=CH—, and Z is —CH$_2$CH$_2$—).

A solution of 15-methyl-PGF$_{2\alpha}$, 11-trimethylsilyl ether, methyl ester (Example 1, 0.6 g.) in 15 ml. of dichloromethane is added to Collins reagent, prepared from chromium trioxide (1.0 g.) and pyridine (1.6 g.) in 50 ml. of dichloromethane and cooled to 0° C. The mixture is stirred for 30 minutes at about 25° C., then filtered. The filtrate is concentrated to yield the title compound, a dark yellow oil, 0.57 g.; infrared absorption at 3400, 2900, 1730, 1720, 1430, 1360, 1240, 1140–1200, 970, 830–900 cm.$^{-1}$; mass spectral peaks at 437, 434, 381, and 362.

Following the procedure of Example 2, but replacing 15-methyl-PGF$_{2\alpha}$, 11-trimethylsilyl ether, methyl ester, with the 11-trimethylsilyl ethers of 15-methyl-PGF$_{2\alpha}$ and its ethyl, tert-butyl, and 2-ethylhexyl esters, there are obtained:

15-methyl-PGE$_2$, 11-trimethylsilyl ether;
15-methyl-PGE$_2$, 11-trimethylsilyl ether, ethyl ester;
15-methyl-PGE$_2$, 11-trimethylsilyl ether, tert-butyl ester; and
15-methyl-PGE$_2$, 11-trimethylsilyl ether, 2-ethylhexyl ester.

Following the procedure of Example 2, but using the 11-trimethylsilyl ethers of 15-ethyl-PGF$_{2\alpha}$ and its methyl, ethyl, tert-butyl, and 2-ethylhexyl esters, there are obtained:

15-ethyl-PGE$_2$, 11-trimethylsilyl ether;
15-ethyl-PGE$_2$, 11-trimethylsilyl ether, methyl ester;
15-ethyl-PGE$_2$, 11-trimethylsilyl ether, ethyl ester;
15-ethyl-PGE$_2$, 11-trimethylsilyl ether, tert-butyl ester; and
15-ethyl-PGE$_2$, 11-trimethylsilyl ether, 2-ethylhexyl ester.

Following the procedure of Example 2, but using the 11-trimethylsilyl ethers of the free acids, methyl esters, ethyl esters, tert-butyl esters, and 2-ethylhexyl esters of 15-methyl-PGF$_{1\alpha}$, 15-methyl-PGF$_{3\alpha}$, 15-methyl-dihydro-PGF$_{1\alpha}$, 15-ethyl-PGF$_{1\alpha}$, 15-ethyl-PGF$_{3\alpha}$, and 15-ethyl-dihydro-PGF$_{1\alpha}$, there are obtained the 11-trimethylsilyl ethers of the corresponding PGE-type compounds.

Following the procedure of Example 2, but using the other 11-silyl ethers of PGF-type compounds and racemic-PGF-type compounds disclosed following Example 1, there are obtained the 11-silyl ethers of the corresponding PGE-type compounds.

EXAMPLE 3

15-Methyl-PGE$_2$ methyl ester (formula VIII:

R$_1$ is methyl, X is trans-CH=CH—, Y is cis-CH=CH—, and Z is —CH$_2$CH$_2$).

A solution of 15-methyl-PGE$_2$, 11-trimethylsilyl ether, methyl ester (Example 2) in 30 ml. of methanol is mixed with 15 ml. of water at about 25° C. and stirred for about 15 min. The mixture is partitioned between diethyl ether and 2 M sodium hydrogen sulfate. The ether extract is washed with saturated aqueous sodium bicarbonate, and brine, dried over sodium sulfate, and concentrated to a product containing the title compound, a light yellow oil, 0.43 g. The product is subjected to chromatography on silica gel, eluting with 5%, 10%, 15%, and 20% acetone in dichloromethane. Those fractions containing the title compound free of starting material and impurities are combined and concentrated to yield the title compound; infrared absorption at 3300, 1728, 1710, 1635, and 1150 cm.$^{-1}$; NMR peaks at 0.2–2.8 (multiplet), 1.3, 3.6, 3.8–4.3 (multiplet) and 5.2–5.7 (multiplet) δ; and mass spectral peaks at 362, 344, 309, and 291.

Following the procedure of Example 3 but replacing 15-methyl-PGE$_2$, 11-trimethylsilyl ether, methyl ester with the 11-trimethylsilyl ethers of 15-methyl-PGE$_2$ and its ethyl, tert-butyl, and 2-ethylhexyl esters, there are obtained:

15-methyl-PGE$_2$;
15-methyl-PGE$_2$, ethyl ester;
15-methyl-PGE$_2$, tert-butyl ester; and
15-methyl-PGE$_2$, 2-ethylhexyl ester.

Following the procedure of Example 3 but using the 11-trimethylsilyl ethers of 15-ethyl-PGE$_2$ and its methyl, ethyl, tert-butyl, and 2-ethylhexyl esters, there are obtained:

15-ethyl-PGE$_2$;
15-ethyl-PGE$_2$, methyl ester;
15-ethyl-PGE$_2$, ethyl ester;
15-ethyl-PGE$_2$, tert-butyl ester; and
15-ethyl-PGE$_2$, 2-ethylhexyl ester.

Following the procedure of Example 3 but using the 11-trimethylsilyl ethers of the free acids, methyl esters, ethyl esters, tert-butyl esters, and 2-ethylhexyl esters of 15 - methyl-PGE$_1$, 15-methyl-PGE$_3$, 15-methyl-dihydro-PGE$_1$, 15-ethyl-PGE$_1$, 15-ethyl-PGE$_3$, and 15-ethyl-dihydro-PGE$_1$, there are obtained the corresponding PGE-type compounds.

Following the procedure of Example 3 but using the other 11-silyl ethers of PGE-type compounds disclosed following Example 2, there are obtained the corresponding PGE-type compounds.

EXAMPLE 4

15-Methyl-PGF$_{2\alpha}$, 11-trimethylsilyl ether, trimethylsilyl ester (formula X: A is methyl, D is

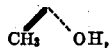

R$_3$ is —Si—(CH$_3$)$_3$, X is trans-CH=CH—, Y is cis-CH=CH—, and Z is —CH$_2$CH$_2$—), and 15-methyl-PGF$_{2\alpha}$, 11-trimethylsilyl ether (formula X: R$_3$ is hydrogen, and A, D, X, Y, and Z are as defined above).

N-Trimethylsilyldiethylamine (2 ml.) is added slowly to a mixture of 15-methyl-PGF$_{2\alpha}$ (Preparation 10, 0.5 g.) and 20 ml. of acetone previously cooled to —30° C., while under nitrogen. The reaction temperature is maintained at about —30° C. for 2 hrs. whereupon the mixture is concentrated under reduced pressure. The residue is subjected to chromatography, eluting with 0–50% acetone in dichloromethane. There are obtained, on concentration of the respective fractions, the two title compounds and, as another fraction, a small amount of 15-methyl-PGF$_{2\alpha}$, 9,11-bis(trimethylsilyl) ether.

Following the procedures of Examples 2 and 3, but replacing 15-methyl-PGF$_{2\alpha}$, 11-trimethylsilyl ether, methyl ester of Example 2 with the 15-methyl- PGF$_{2\alpha}$, 11-trimethylsilyl ether, trimethylsilyl ester from above, there is obtained 15-methyl-PGE$_2$. When that product is transformed to its methyl ester with diazomethane by procedures known in the art, there is obtained 15-methyl-PGE$_2$, methyl ester having the same properties as the title compound of Example 3.

EXAMPLE 5

15-Methyl-PGF$_{2\alpha}$, 11-triphenylsilyl ether methyl ester (formula X: A is phenyl, D is

R$_3$ is methyl, X is trans-CH=CH—, Y is cis-CH=CH—, and Z is —CH$_2$CH$_2$—).

A solution of 15-methyl-PGF$_{2\alpha}$, methyl ester (Preparation 10, 0.05 g.), chlorotriphenylsilane (0.1 g.), and 5 ml. of anhydrous pyridine is stirred at about 25° C. under nitrogen. Progress of the reaction is monitored by TLC. After 2 hrs., about 5 ml. of water is added and the mixture is extracted with diethyl ether. The ether solution is washed with aqueous sodium hydrogen sulfate, saturated aqueous sodium bicarbonate, and brine, then dried over sodium sulfate and concentrated. The residue is subjected to silica gel chromatography. Those fractions shown by TLC to contain the desired compound free of starting material and impurities are combined and concentrated to yield the title compound.

Following the procedure of Example 5, but replacing chlorotriphenylsilane with chlorotriethylsilane, chlorotriisobutylsilane, chlorotris(p-chlorophenyl)silane, chlorotri-m-tolylsilane, and tribenzylchlorosilane, there are obtained:

15-methyl-PGF$_{2\alpha}$, 11-triethylsilyl ether, methyl ester;
15-methyl-PGF$_{2\alpha}$, 11-triisobutylsilyl ether, methyl ester;
15-methyl-PGF$_{2\alpha}$, 11-tris(p-chlorophenyl)silyl ether, methyl ester;
15-methyl-PGF$_{2\alpha}$, 11-tri-m-tolylsilyl ether, methyl ester; and
15-methyl-PGF$_{2\alpha}$, 11-tribenzylsilyl ether, methyl ester.

Following the procedures of Examples 2 and 3, but replacing 15-methyl-PGF$_{2\alpha}$, 11-trimethylsilyl ether, methyl ester, of Example 2 with the specific 11-silyl ethers of and following Example 5, there is obtained in each instance 15-methyl-PGE$_2$, methyl ester.

What is claimed is:
1. A process for producing an optically active compound of the formula:

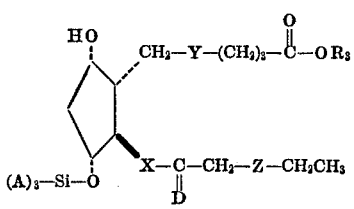

or a racemic compound of that formula and the mirror image thereof, wherein (a) X is trans-CH=CH— or —CH$_2$CH$_2$—, and Y and Z are both —CH$_2$CH$_2$—, or (b) X is trans-CH=CH—, Y is cis-CH=CH—, and Z is —CH$_2$CH$_2$— or cis-CH=CH—, wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive, wherein D is

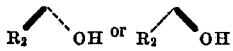

wherein R$_2$ is methyl or ethyl, and wherein R$_3$ is hydrogen, alkyl of one to 8 carbon atoms, inclusive, or —Si—(A)$_3$ wherein A is as defined above, which comprises reacting an optically active compound of the formula:

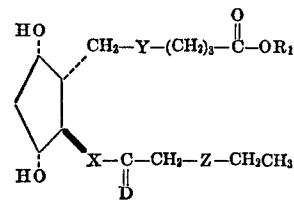

or a racemic compound of that formula and the mirror image thereof, wherein D, R$_1$, R$_2$, X, Y, and Z are as defined above, with a silylating agent.

2. An optically active compound of the formula

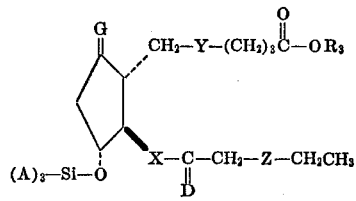

or a racemic compound of that formula and the mirror image thereof, wherein (a) X is trans-CH=CH— or —CH$_2$CH$_2$—, and Y and Z are both —CH$_2$CH$_2$—, or (b) X is trans-CH=CH—, Y is cis-CH=CH—, and Z is —CH$_2$CH$_2$— or cis-CH=CH—, wherein A is alkyl of one to 4 carbon atoms, inclusive, phenyl, phenyl substituted with one or 2 fluoro, chloro, or alkyl of one to 4 carbon atoms, inclusive, or aralkyl of 7 to 12 carbon atoms, inclusive, wherein D is

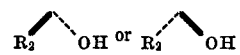

wherein R$_2$ is methyl or ethyl; wherein G is

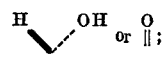

and wherein R$_3$ is hydrogen, alkyl of one to 8 carbon atoms, inclusive, or —Si—(A)$_3$ wherein A is as defined above.

3. An optically active compound according to claim 2.
4. A compound according to claim 3 wherein D is

5. A compound according to claim 4 wherein R$_2$ is methyl.
6. A compound according to claim 5 wherein X is trans-CH=CH—, Y is cis-CH=CH—, and Z is

—CH$_2$CH$_2$—.

7. A compound according to claim 6 wherein G is

8. A compound according to claim 6 wherein G is

9. A compound according to claim 6 wherein A is methyl.

10. A compound according to claim 9 wherein $R_3$ is Si—$(CH_3)_3$.

11. A compound according to claim 9 wherein $R_3$ is hydrogen.

12. A compound according to claim 9 wherein $R_3$ is methyl.

13. 15-Methyl-$PGF_{2\alpha}$, 11-trimethylsilyl ether, methyl ester, a compound according to claim 2.

14. 15-Methyl-$PGE_2$, 11-trimethylsilyl ether, methyl ester, a compound according to claim 2.

References Cited

UNITED STATES PATENTS 3,651,116   3/1972   Lincoln et al. ____ 260—448.8 R

DANIEL E. WYMAN, Primary Examiner

P. F. SHAVER, Assistant Examiner

U.S. Cl. X.R.

260—484 R, 535 R; 424—184

UNITED STATES PATENT AND TRADEMARK OFFICE
CERTIFICATE OF CORRECTION

PATENT NO. : 3,822,303
DATED : July 2, 1974
INVENTOR(S) : Ernest W. Yankee

It is certified that error appears in the above-identified patent and that said Letters Patent are hereby corrected as shown below:

Column 2, line 35, "or" should read -- to --; line 41, "and" should read -- to --; line 65, "$PGF_1$" should read -- $PGE_1$ --; line 68, "$PKE_2$" should read -- $PGE_2$ --; line 70, "$PGF_1$, $PGF_2$, $PGF_3$, dihydro-$PGF_1$" should read -- $PGE_1$, $PGE_2$, $PGE_3$, dihydro-$PGE_1$ --. Column 3, line 25 "PGF" should read -- PGE --; line 50, "keg." should read -- kg. --; line 52, "keg." should read -- kg. --. Column 4, lines 3-4, "useful as other fluids which are used in artificial extracorporeal additives to blood, blood products, blood substitutes and other fluids which are used in artificial extracorporeal circulation" should read -- useful as additives to blood, blood products, blood substitutes, and other fluids which are used in artificial extracorporeal circulation --; line 19, "lier" should read -- liter --. Column 14, line 46, "septrometer" should read -- spectrometer --; line 65, "1630" should read -- 1620 --. Column 15, line 71, " " should read -- 15-oxo-$PGF_{1\alpha}$ --. Column 16, line 8, "which are an" should read -- which an --; line 38, "$PGF1_{1\alpha}$" should be -- $PGF_{1\alpha}$ --; line 65, "416" should be -- 316 --. Column 17, line 60, "-oxo-$PGF_{\alpha 3}$" should read -- -oxo-$PGF_{3\alpha}$ --. Column 18, line 2, "acid acid or" should read -- acid or --. Column 19, line 69, " " should read -- D is -$CH_2CH_2$-) --.

Signed and Sealed this

Twenty-seventh Day of July 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,822,303                    Dated July 2, 1974

Inventor(s) Ernest W. Yankee

It is certified that error appears in the above-identified patent and that said Letters Patent are hereby corrected as shown below:

Column 1, line 5, " " should read -- assignor to The Upjohn Company, Kalamazoo, Mich. --.

Signed and Sealed this

Tenth Day of May 1977

[SEAL]

Attest:

RUTH C. MASON
*Attesting Officer*

C. MARSHALL DANN
*Commissioner of Patents and Trademarks*